(12) United States Patent
Jiang et al.

(10) Patent No.: US 8,270,754 B2
(45) Date of Patent: Sep. 18, 2012

(54) LENS ROLL-OFF CORRECTION OPERATION USING VALUES CORRECTED BASED ON BRIGHTNESS INFORMATION

(75) Inventors: Xiaoyun Jiang, San Diego, CA (US); Szepo R. Hung, San Diego, CA (US); Hisiang-Tsun Li, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 602 days.

(21) Appl. No.: 12/488,737

(22) Filed: Jun. 22, 2009

(65) Prior Publication Data
US 2010/0322532 A1    Dec. 23, 2010

(51) Int. Cl.
*G06K 9/00*    (2006.01)
(52) U.S. Cl. ............ 382/274; 348/222.1; 348/240.99
(58) Field of Classification Search .......... 382/100, 382/274; 348/240.99, 222.1
See application file for complete search history.

(56) References Cited

U.S. PATENT DOCUMENTS
| | | | |
|---|---|---|---|
| 6,094,508 A | 7/2000 | Acharya et al. | |
| 8,023,758 B2 * | 9/2011 | Hung et al. | 382/255 |
| 2004/0095611 A1 * | 5/2004 | Watanabe et al. | 358/3.26 |
| 2006/0056082 A1 * | 3/2006 | Hung | 359/819 |
| 2009/0043524 A1 * | 2/2009 | Hung et al. | 702/86 |
| 2009/0059041 A1 * | 3/2009 | Kwon | 348/241 |

FOREIGN PATENT DOCUMENTS
| | | |
|---|---|---|
| JP | 2004048562 | 2/2004 |
| JP | 2004222134 | 8/2004 |
| JP | 2008-124793 | * 5/2008 |
| JP | 2008124793 | 5/2008 |

OTHER PUBLICATIONS

International Search Report and Written Opinion—PCT/US2010/039383, International Search Authority—European Patent Office—Sep. 23, 2010.

* cited by examiner

*Primary Examiner* — Stephen R Koziol

(74) *Attorney, Agent, or Firm* — Michael DeHaemer; James R. Gambale, Jr.

(57) ABSTRACT

A method is disclosed that includes receiving image data and calculating brightness information of the image data. The method includes correcting at least one lens roll-off value to be used in a lens roll-off correction operation based on the brightness information. The method also includes performing the lens roll-off correction operation on the image data using the at least one corrected lens roll-off value.

27 Claims, 7 Drawing Sheets

LENS ROLL-OFF CORRECTION OPERATION USING VALUES CORRECTED BASED ON BRIGHTNESS INFORMATION

I. FIELD

The present disclosure is generally related to scene dependent adjustment of a lens roll-off correction of an image.

II. DESCRIPTION OF RELATED ART

Advances in technology have resulted in smaller and more powerful computing devices. For example, there currently exist a variety of portable personal computing devices, including wireless computing devices such as portable wireless telephones, personal digital assistants (PDAs), and paging devices, that are small, lightweight, and easily carried by users. More specifically, portable wireless telephones, such as cellular telephones and internet protocol (IP) telephones, can communicate voice and data over wireless networks. Further, wireless telephones may include other types of devices that are incorporated therein. For example, a wireless telephone can include a digital still camera, a digital video camera, a digital recorder, and an audio file player. Wireless telephones may also process executable instructions, including software applications, such as a web browser application that can be used to access the Internet. As a further example, digital image processing techniques may be used to support multimedia functions at mobile terminals.

One facet of digital image processing involves processing color information. Color information is generally represented as a composite signal consisting of red, green and blue (RGB) components. The data capacity required to convey color information may be reduced by taking advantage of the relatively poor color acuity of the human eye, provided that full luma bandwidth is maintained. In particular, the RGB components of a signal may be transformed into luma (Y) and chroma ($C_b$, $C_r$) components, and the chroma components may be compressed.

The luma (Y) component is generally associated with the brightness of an image. The brightness of an image may be affected by lens shading. A lens roll-off correction may be employed in digital imaging processing systems to compensate for darkening caused by lens shading. In some scenarios, bright objects near the edges of the image may preserve details if there is no lens roll-off correction. However, after applying gains to the image during the lens roll-off process such details may be rendered indistinguishable due to oversaturation.

III. SUMMARY

An image processing system is disclosed to perform a lens roll-off correction operation that does not render details in image data indistinguishable due to oversaturation of the image. The image processing system prevents oversaturation by performing the lens roll-off correction operation using values that have been corrected based on brightness information of the image data. Correcting the values based on the brightness information of the image data enables the values to be reduced to avoid oversaturation in instances where applying default correction values would result in a lens roll-off correction operation that increased the brightness of the image such that details in the image were lost. Thus, correcting the values based on the brightness information enables the image processing system to compensate for image degradation due to lens roll-off by performing a lens roll-off correction operation that does not further degrade the image quality by causing oversaturation.

In a particular embodiment, a method is disclosed that includes receiving image data. The method also includes calculating brightness information of the image data. The method also includes correcting at least one lens roll-off value to be used in a lens roll-off correction operation based on the brightness information. The method also includes performing the lens roll-off correction operation on the image data using the at least one corrected lens roll-off value.

In another particular embodiment, an apparatus is disclosed that includes an image processor. The image processor is configured to receive image data and to calculate brightness information of the image data. The image processor is also configured to correct at least one lens roll-off correction value to be used in a lens roll-off correction operation based on the brightness information. The image processor is also configured to perform the lens roll-off correction operation using the at least one corrected lens roll-off value.

In another particular embodiment, an apparatus is disclosed that includes means for receiving image data. The apparatus further includes means for calculating brightness information of the image data. The apparatus further includes means for correcting at least one lens roll-off value to be used in a lens roll-off correction operation based on the brightness information. The apparatus further includes means for performing the lens roll-off correction operation on the image data using the corrected lens roll-off value.

In another particular embodiment, a computer readable medium is disclosed that stores computer executable code comprising code for receiving image data. The computer readable medium also includes code for calculating brightness information of the image data. The computer readable medium further includes code for correcting at least one lens roll-off value to be used in a lens roll-off correction operation based on the brightness information. The computer readable medium further includes code for performing the lens roll-off correction operation on the image data using the corrected lens roll-off value.

One particular aspect provided by the disclosed embodiments is an adjustment of the brightness of a pixel of an image based on the brightness of a region that includes the pixel. Adjusting the brightness of a pixel of an image based on the brightness of a region that includes the pixel may preserve detail in the image by preventing oversaturation due to gains applied in a lens correction processor.

Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

V. DETAILED DESCRIPTION

Figure 1:
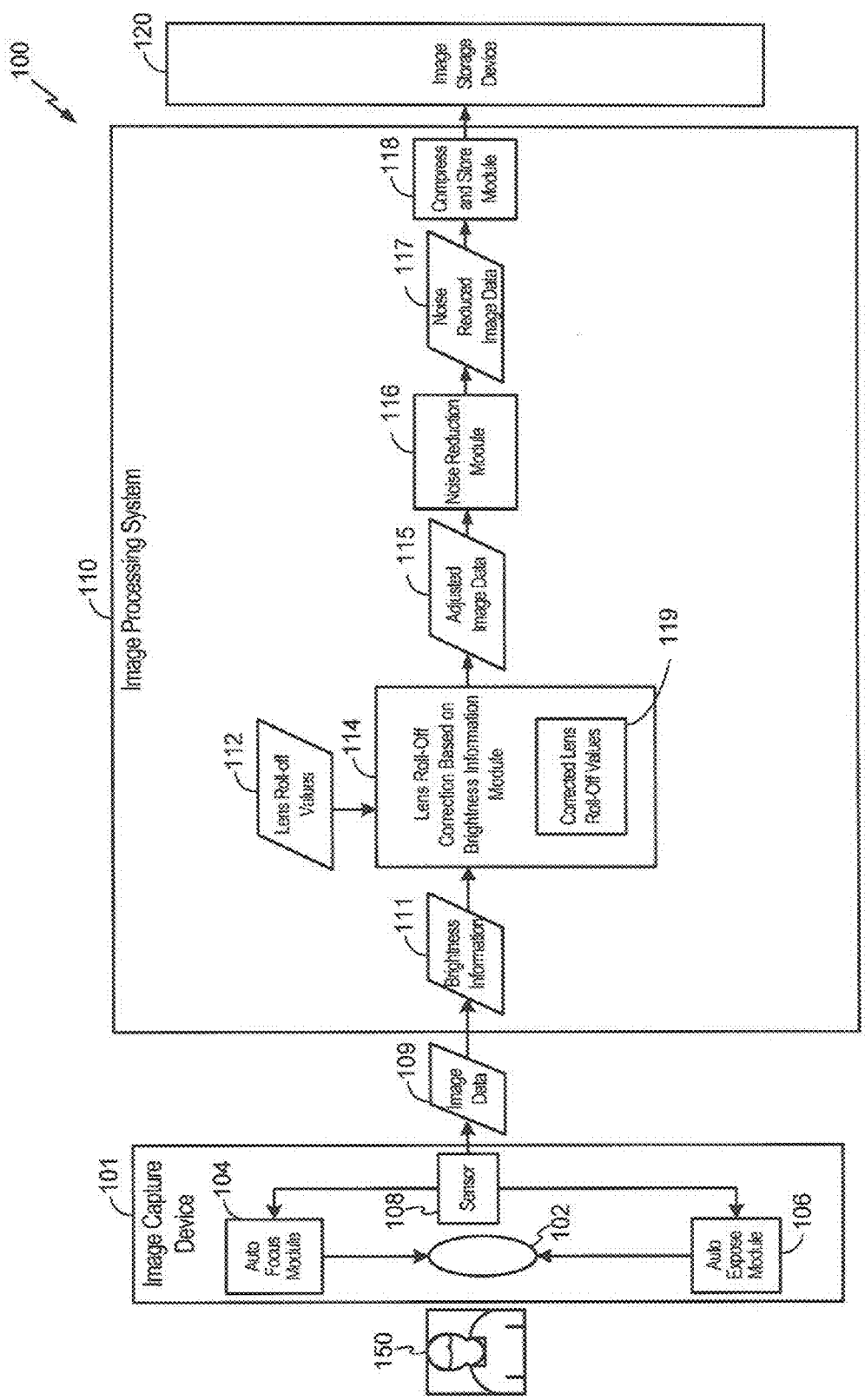
FIG. 1 is a block diagram of a particular illustrative embodiment of an image capturing and processing system having a lens roll-off correction based on brightness information module.

Referring to FIG. 1, an illustrative embodiment of an image capturing and processing system is depicted and generally designated 100. The image capturing and processing system 100 includes an image capture device 101, an image processing system 110, and an image storage device 120. The image capture device 101 includes a lens 102, an auto focus module 104, an auto expose module 106, and a sensor 108. The image processing system 110 includes a lens roll-off correction based on brightness information module 114, a noise reduction module 116, and a compress and store module 118. The image capturing and processing system 100 may be an electronic device configured to adjust a brightness of a pixel by performing a lens roll-off correction operation based on lens roll-off correction values 112 that are corrected based on brightness information 111.

In a particular embodiment, the image capture device 101 is a camera, such as a video camera or a still camera. As depicted in FIG. 1, the lens 102 of the image capture device 101 may be coupled to the auto focus module 104 and to the auto expose module 106. In a particular embodiment, the lens 102 is responsive to the auto focus module 104 and the auto expose module 106. The sensor 108 may be adapted to receive light via the lens 102 and to generate image data 109 in response to an image 150 received via the lens 102. The sensor 108 may be a charge-coupled device (CCD), a complementary metal oxide semiconductor (CMOS) image detector, a photodiode array, a photovoltaic detector, or some other sensor for capturing an optical image. In a particular embodiment, the auto focus module 104 is responsive to the sensor 108 and is adapted to automatically control focusing of the lens 102. The auto expose module 106 may be responsive to the sensor 108 and may be adapted to control an exposure of the image 150. The image data 109 may be communicated between the sensor 108 and the image processing system 110.

In a particular embodiment, the image processing system 110 is a digital image processing integrated circuit configured to adjust the image data 109 received from the image capture device 101. The image processing system 110 may be configured as a pipeline, where the image data 109 is received at a module, adjusted, and transmitted to another module. In a particular embodiment, the image processing system 110 may be configured to calculate the brightness information 111 of the image data 109.

The lens roll-off correction based on brightness information module 114 is configured to receive the image data 109 from the image capture device 101 or from a prior module (not shown) of the image processing system 110. The lens roll-off correction based on brightness information module 114 is configured to correct at least one lens roll-off correction value 112 to be used in a lens roll-off correction operation based on the brightness information 111 to generate corrected lens roll-off values 119. In a particular embodiment, the lens roll-off correction based on brightness information module 114 is configured to perform the lens roll-off correction operation using the at least one corrected lens roll-off value by using the corrected lens roll-off values 119. Performing the lens roll-off correction operation results in adjusted image data 115.

The lens roll-off correction based on brightness information module 114 may be configured to transmit the adjusted image data 115 to the noise reduction module 116 to remove noise from the adjusted image data 115. The noise reduction module 116 may be configured to remove multiple types of noise using a variety of methods. In a particular embodiment, the noise reduction module 116 may be configured to determine when a pixel in the adjusted image data 115 is different in color or illumination intensity from one or more immediately surrounding pixels and to change a brightness of the pixel based on that determination. For example, the noise reduction module 116 may apply a low pass filter to remove high-frequency components (e.g., a particular pixel that is brighter than surrounding pixels) in selected areas.

In a particular embodiment, the noise reduction module 116 is configured to transmit noise reduced image data 117 to the compress and store module 118. The compress and store module 118 may be configured to receive the noise reduced image data 117 from the noise reduction module 116 and to store the noise reduced image data 117 at the image storage device 120. For example, the compress and store module 118 may use Joint Photographic Experts Group (JPEG) encoding to encode the noise reduced image data 117 to be stored. The image storage device 120 may include storage media, such as one or more display buffers, registers, caches, flash memory elements, hard disks, any other storage device, or any combination thereof.

During operation, the image capturing and processing system 100 may generate the image data 109 at the image capture device 101, process the image data 109 at the image processing system 110, and store the processed image data at the image storage device 120. In one embodiment, the lens 102 receives the image 150 as light enters the lens 102, while the auto focus module 104 and the auto expose module 106 automatically adjust the lens 102 responsive to the sensor 108. In response to the image 150 received from the lens 102, the sensor 108 generates the image data 109. In a particular embodiment, the image data 109 is an electronic representation of the image 150 in the form of light components. For example, the sensor 108 may generate distinct red (R), green (G), and blue (B) representations corresponding to pixels of the captured image 150. In a particular embodiment, the sensor 108 includes multiple detectors, or pixel wells, that are arranged so that adjacent detectors detect different colors of light. For example, received light may be filtered so that each detector receives red, green, or blue incoming light.

The image data 109 may not accurately represent the image 150 due to various distortions caused by physical characteristics and geometries of the lens 102, the sensor 108, or both. For example, such distortions may occur as a result of shading occurring at pixel wells due to an incident angle of incoming light at an edge of the sensor, distortion due to differences in refraction of each color component at the lens, or distortion due to lens imperfections or misalignment, as illustrative, non-limiting examples. Such factors are collectively herein referred to as lens roll-off.

The image processing system 110 may enhance the image data 109 by applying various image processing operations prior to storing the image data 109. The lens roll-off correction based on brightness information module 114 is configured to process the image data 109 to correct for lens roll-off by performing a lens roll-off correction operation. As another example, the noise reduction module 116 may adjust portions of the image data 109 by performing noise reduction.

In a particular embodiment, the lens roll-off correction based on brightness information module 114 uses the lens roll-off values 112 to perform the lens roll-off operation. The lens roll-off values 112 may include a default set of correction factors that can be applied to pixel values to change the brightness values of the pixels to at least partially offset lens roll-off effects. The lens roll-off values 112 may correspond to individual pixels of the image data 109 or to a plurality of pixels of the image data 109. For example, the lens roll-off correction based on brightness information module 114 may use a single lens roll-off value to adjust a plurality of pixels in the image data 109. The lens roll-off values 112 may be determined based on a distance of each pixel of the image data from a center of the image 150. For example, a first correction factor for a lens roll-off value that corresponds to a first pixel that represents the upper corner of the image 150 may be larger than a correction factor for a second lens roll-off value that corresponds to a second pixel that represents the center of the image 150.

The lens roll-off correction based on brightness information module 114 may use the brightness information 111 to correct the lens roll-off values 112 before performing the lens roll-off correction operation. Performing the lens roll-off correction operation on the image data 109 using the corrected lens roll-off values 119 may preserve more detail in the image data than a performance of a lens roll-off correction operation that uses uncorrected lens roll-off values (e.g., the lens roll-off values 112). For example, uncorrected lens roll-off values may have correction factors that increase as the distance from the center of the image to the corresponding pixel increases. In this case, using the uncorrected lens roll-off values to perform the lens roll-off correction operation on the image data 109 containing pixels that are very bright may result in oversaturation of the image data 109. For example, performing a lens roll-off correction operation using uncorrected lens roll-off values (e.g., the lens roll-off values 112) to adjust pixels of an image that includes a bright skyline may increase the brightness of the pixels representing the skyline. However, increasing the brightness of pixels representing the skyline may result in a loss of detail in the skyline. For example, variations in color and darkness in clouds that are part of the skyline may be lost as the brightness of all of the clouds is increased to a maximum brightness level.

To prevent oversaturation, the correction factors of the lens roll-off values 112 may be reduced. By reducing the lens roll-off values 112, the lens roll-off correction operation may result in little or no increase in the brightness of pixels that are near saturation. For example, performance of the lens roll-off correction operation with the corrected lens roll-off values 119 may result in little or no increase in the brightness of a pixel representing a cloud after determining the region surrounding the cloud pixel is already bright. In this case, even though the pixel representing the cloud is in an area of the image that may have a reduced brightness due to lens roll-off, the brightness of the pixel representing the cloud is not increased to a maximum brightness level. By preventing the lens roll-off correction operation from applying a gain that increases pixel brightness to a maximum brightness level, degradation of the image data due to lens roll-off may be corrected without loss of detail due to oversaturation.

In a particular embodiment, the brightness information 111 includes a brightness value corresponding to each of a plurality of color components and the lens roll-off values 112 includes values for each of the color components. Correcting the lens roll-off values based on brightness values corresponding to each of a plurality of color components may include correcting a lens roll-off value that corresponds to one of the color components. In a particular embodiment, a particular lens roll-off value may be used by the lens roll-off correction based on brightness information module 114 to perform the lens roll-off operation on a particular color component of a pixel of the image data 109. For example, performing the lens roll-off correction operation on the image data 109 may include increasing a brightness value of at least one color component of the pixel. Performing the lens roll-off correction operation on brightness values for each color component may allow greater accuracy in correcting image degradation due to lens roll-off.

Figure 2:
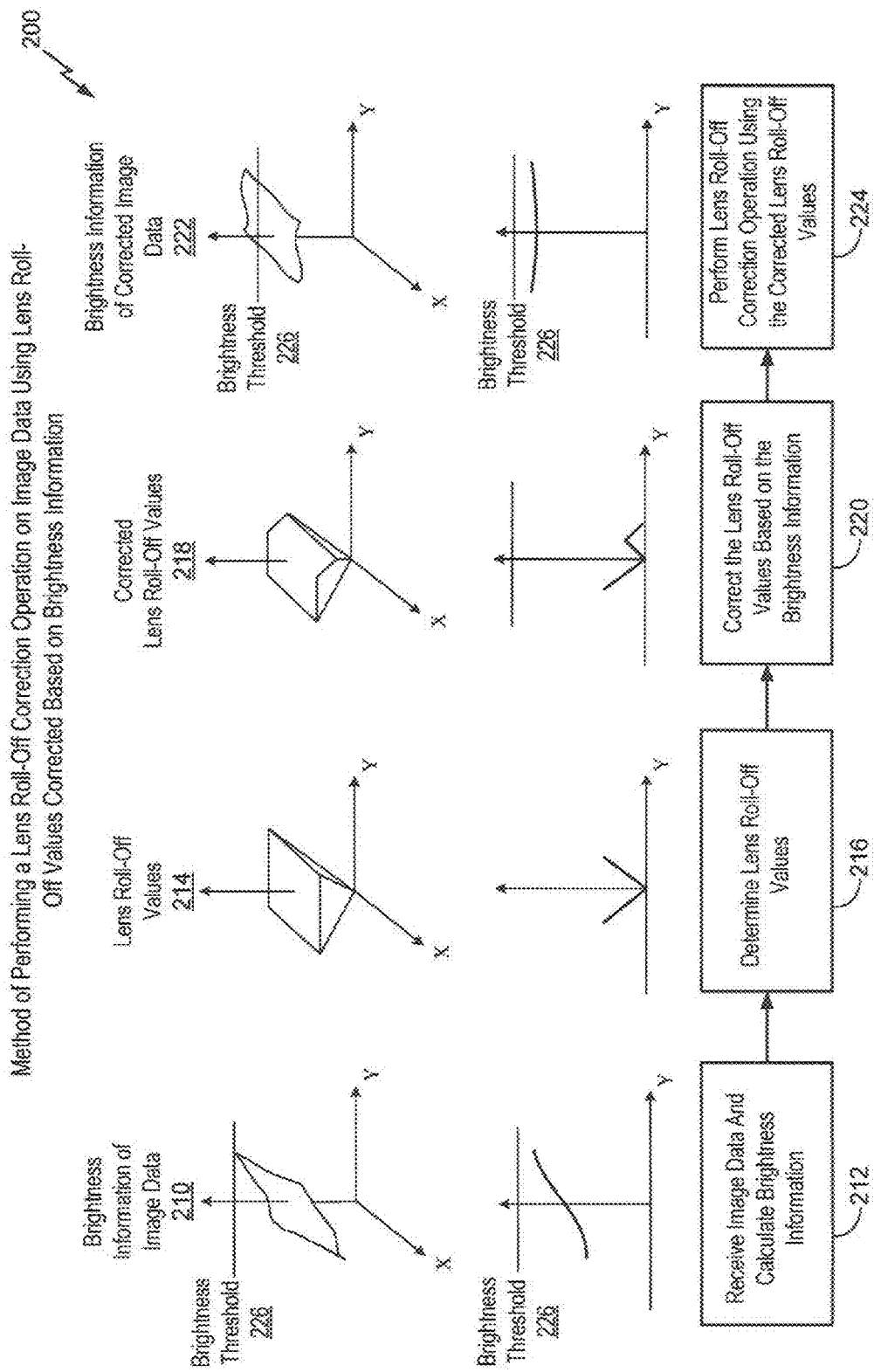
FIG. 2 is a general diagram that illustrates a method of performing a lens roll-off correction operation on image data using values corrected based on brightness information.

Referring to FIG. 2, an illustrative embodiment of a method of performing a lens roll-off correction operation on image data using lens roll-off values corrected based on brightness information is disclosed and is generally designated 200. An image processing system (e.g., the image processing system 110 of FIG. 1) may perform a lens roll-off correction operation according to the method 200.

The image processing system may receive image data and calculate brightness information, at 212. The brightness information may indicate the brightness of the pixels in the image data. In a particular embodiment, the brightness information of pixels is represented based on a function of the location of the pixels. As is illustrated in FIG. 2 by a graph 210 of the brightness information, an "X" axis and a "Y" axis correspond to coordinates of a two-dimensional plane of an image. The third axis of the graph represent the brightness measurement of the pixels at their location (X,Y). For example, as is illustrated in the graph 210 of the brightness information of the image data, the brightness of the pixels in the image data generally increases with increasing the "Y" value (e.g., the pixels representing the right side of the image are brighter than the pixels representing the left side of the image).

The image processing system may determine lens roll-off values, at 216. In a particular embodiment, the lens roll-off values are computed based on a function of the location of the pixels and can represent gain values to be applied to the pixels. As is illustrated in FIG. 2 by a graph 214 of the lens roll-off values, an "X" axis and a "Y" axis correspond to coordinates of a two-dimensional plane of an image. The third axis represents the lens roll-off values of the pixels at specific locations (X,Y). In a particular embodiment, at least one lens roll-off value is computed from a lens roll-off correction function. For example, according to the graph 214 of the lens roll-off values, the lens roll-off values increase with increasing the distance from the center of the image. In this case, the pixels representing the outer edges of the image have the highest corresponding lens roll-off values.

The image processing system may correct the lens roll-off values based on brightness information, at 220. Correcting the lens roll-off values based on the brightness information may include reducing at least one lens roll-off value when a performance of the lens roll-off correction operation would increase a brightness value of a pixel above a brightness threshold 226. For example, performance of the lens roll-off correction operation using the lens roll-off values from the graph 214 of lens roll-off values would increase the brightness information of the image data above the brightness threshold 226. Alternatively, or in addition, correcting the lens roll-off values based on the brightness information may include increasing the one or more lens roll-off values. In a particular embodiment, increasing or reducing lens roll-off values may include introducing a change to the lens roll-off correction function. For example, the lens roll-off correction function may be changed by the addition of a coefficient to a term of an equation representing the lens roll-off correction function.

FIG. 2 includes a graph 218 of corrected lens roll-off values that have been reduced. As is illustrated in the graph 218, the lens roll-off values corresponding to the pixels representing the right side of the image were reduced based on the brightness information to prevent over-saturation. For example, in response to calculating brightness information of the pixels representing the right side of the image that is close to the brightness threshold 226, the image processing system may reduce the lens roll-off values that correspond to the pixels representing the right side of the image in order to avoid the brightness information of the pixels exceeding the brightness threshold 226 after performance of the lens roll-off correction operation. However, the lens roll-off values to be applied to the left side of the image were not reduced in the graph 218 because performance of the lens roll-off correction operation using the uncorrected lens roll-off values would not increase the brightness information of the pixels representing the left side above the threshold.

The image processing system may perform a lens roll-off correction operation using the corrected lens roll-off values, at 224. In a particular embodiment, performing a lens roll-off correction operation includes applying corrected lens roll-off values to corresponding pixels. For example, as is illustrated in a graph 222 of brightness information of corrected data, brightness of the image data of the pixels representing the right side of the image was increased by a lower percentage than the brightness of the image data of the pixels representing the left side of the image.

Figure 3:
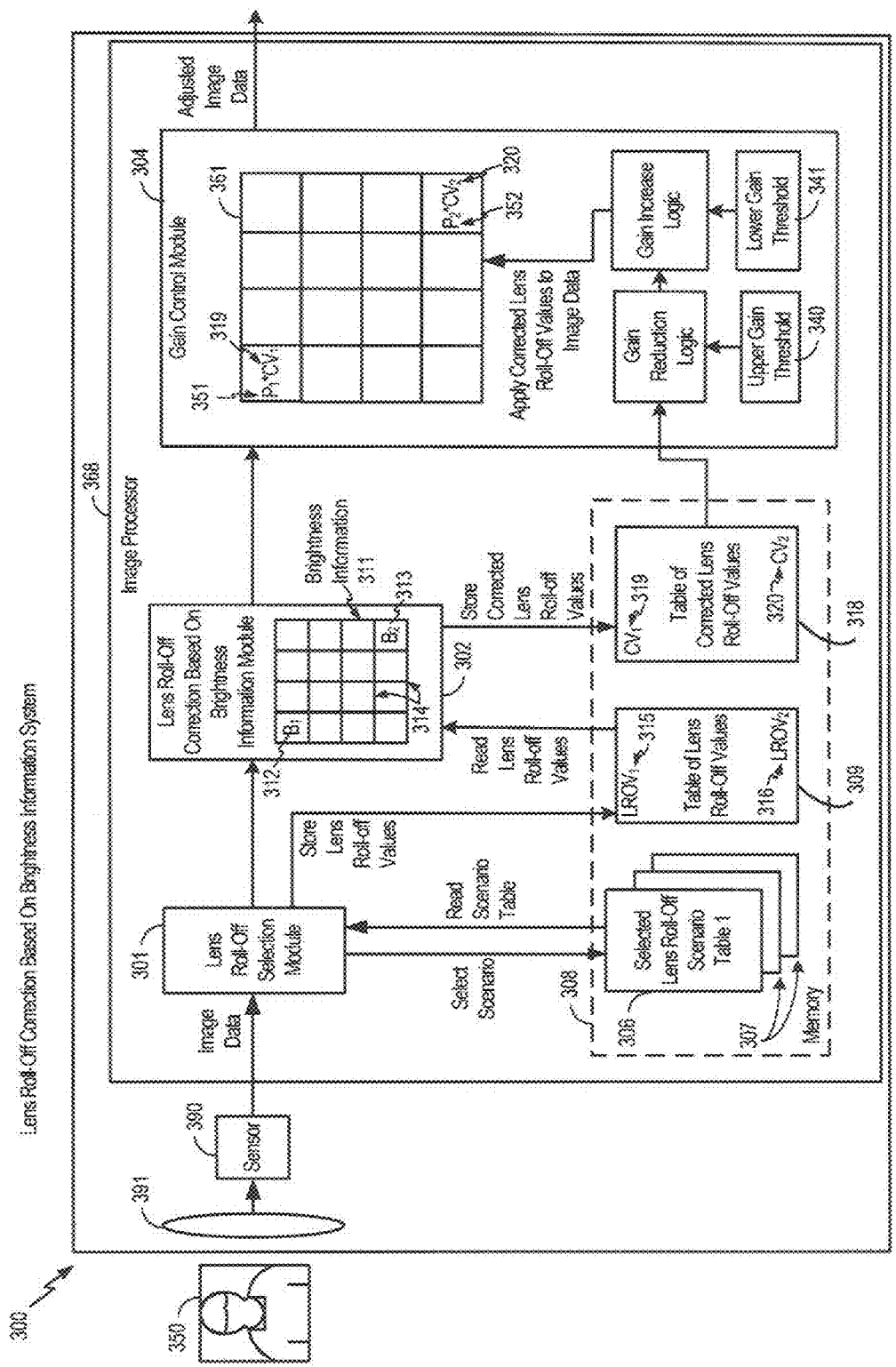
FIG. 3 is a block diagram of an illustrative embodiment of a system to perform a lens roll-off correction operation on image data using values corrected based on brightness information.

Referring to FIG. 3, an illustrative embodiment of a lens roll-off correction based on brightness information system is depicted and generally designated 300. The lens roll-off correction based on brightness information system 300 may be the image capturing and processing system 100 of FIG. 1. In a particular embodiment, as illustrated in FIG. 3, the lens roll-off correction based on brightness information system 300 includes a lens 391, a sensor 390, and an image processor 368. The image processor 368 is coupled to the sensor 390, and the sensor 390 may be coupled to the lens 391. The image processor 368 may include a memory 308, a lens roll-off selection module 301, a lens roll-off correction based on brightness information module 302, and a gain control module 304. The lens roll-off selection module 301 determines initial lens roll-off values, the lens roll-off correction based on brightness information module 302 corrects the lens roll-off values based on brightness information, and the gain control module 304 applies the corrected lens roll-off values to the image data after verifying the corrected lens roll-off values satisfy upper and lower gain thresholds.

The sensor 390 is configured to capture an image 350 received via the lens 391 and communicate the image 350 to the image processor 368 as image data. In a particular embodiment, the image data includes brightness information 311 of the image 350 in addition to individual pixel values. Alternatively, the image processor 368 may be configured to calculate the brightness information 311. As illustrated, the brightness information 311 may include brightness measures for each region of a grid 314, such as a first brightness measurement ($B_1$) 312 and a second brightness measurement ($B_2$) 313.

In a particular embodiment, the lens roll-off correction based on brightness information module 302 is configured to define a plurality of regions of the image 350 including a first defined region and a second defined region. In a particular embodiment, the plurality of regions correspond to the grid 314 of substantially equal sized regions. In the embodiment illustrated in FIG. 3, the grid 314 includes sixteen equally sized square regions. Alternatively, the grid 314 may include any number of regions, and the equally sized regions may be rectangular, pyramidal, or another shape. Also, in other embodiments, the regions may have different sizes.

As illustrated, the plurality of regions (e.g., the sixteen equally sized square regions of FIG. 3) are defined prior to determining brightness information of the individual regions. However, in other embodiments, the image processor 368 may be configured to define at least one region of the image data. In a particular embodiment, at least one region of the plurality of regions is identified using edge detection. For example, a region may be identified containing pixels with substantially similar brightness levels, where the substantially similar brightness levels differ from the brightness levels outside the region by a predetermined amount.

The lens roll-off correction based on brightness information module 302 may be configured to correct at least one lens roll-off value to be used in a lens roll-off correction operation based on the brightness information 311. In a particular embodiment, correcting the at least one lens roll-off value based on the brightness information 311 includes reducing the at least one lens roll-off value when a performance of the lens roll-off correction operation would increase a brightness value of a pixel above a brightness threshold. In a particular embodiment, the lens roll-off correction based on brightness information module 302 is configured to correct a first lens roll-off value ($LROV_1$) 315 based on the first brightness measurement 312 of a first defined region of the image 350. The lens roll-off correction based on brightness information module 302 may be configured to correct a second lens roll-off value ($LROV_2$) 316 based on the second brightness measurement 313 of a second defined region of the image 350.

The gain control module 304 may be configured to correct the at least one lens roll-off value based on a gain threshold. For example, correcting the at least one lens roll-off value based on the gain threshold includes reducing the at least one lens roll-off value when the at least one lens roll-off value is above an upper gain threshold 340. Alternatively, correcting the at least one lens roll-off value based on the gain threshold may include increasing the at least one lens roll-off value when the lens roll-off value is below a lower gain threshold 341.

The gain control module 304 may be configured to perform the lens roll-off correction operation using the corrected lens roll-off values. In a particular embodiment, performing the lens roll-off correction operation on the image data includes increasing a brightness value of a pixel in the image data. Increasing the brightness value of the pixel includes multiplying the brightness value of the pixel by at least one corrected lens roll-off value. During the lens roll-off correction operation, the amount the brightness value of the pixel is increased may be based on the corrected lens roll-off values. For example, the gain control module 304 may be configured to adjust a first pixel value ($P_1$) 351 in the first defined region at least partially based on a first corrected lens roll-off value ($CV_1$) 319. In a particular embodiment, the gain control module 304 is configured to adjust a second pixel value ($P_2$) 252 of the second defined region at least partially based on a second corrected lens roll-off value ($CV_2$) 320. Alternatively, the gain control module 304 may adjust the pixel values based on a combination of the corrected lens roll-off values and other information. Thus, the adjusted pixel values are at least partially based on the corrected lens roll-off values but may be based on additional information.

During operation, the sensor 390 may receive the image 350 and convert the image 350 into image data that may be received by the lens roll-off selection module 301. Based on the image data, the lens roll-off selection module 301 may generate a lens roll-off characteristic such as a lighting condition and use the lens roll-off characteristic to select a lens roll-off value scenario table 306 from a plurality of lens roll-off value scenario tables 307. Alternatively, the lens roll-off value scenario table 306 may be selected directly by a user. For example, the user may select the lens roll-off value scenario table 306 based on the lighting conditions before the image 350 is captured, such as by selecting a low-light lens roll-off value scenario table when low-light conditions are present at the time before the image 350 is captured. Alternatively, the lens roll-off selection module 301 may choose a high-light lens roll-off value scenario table when the sensor 390 indicates high-light conditions are present at the time before the image 350 is captured. In other embodiments, the selection of a lens roll-off value scenario table is performed after the image 350 is captured. The selected lens roll-off value scenario table 306 and the plurality of lens roll-off value scenario tables 307 may be stored in the memory 308.

After selection of the lens roll-off value scenario table 306, the lens roll-off selection module 301 may use the values in the selected lens roll-off value scenario table 306 to determine a correction factor to be applied to the image data. In a particular embodiment, the correction factor applied to pixels in the image data may depend on the location of the pixels relative to the center of the image 350. For example, the correction factor applied to the pixel may increase as a distance of the pixel to the center of the image 350 increases. In a particular embodiment, each correction factor corresponding to the pixel locations of the image data selected or computed by the lens roll-off selection module 301 results in lens roll-off values. For example, the correction factor applied to a first pixel may result in the first lens roll-off value 315. In a particular embodiment, application of the correction factor applied to a second pixel results in the second lens roll-off value 316. The lens roll-off selection module 301 may store the first lens roll-off value 315 and the second lens roll-off value 316 in the memory 308 in a table of lens roll-off values 309. Although the lens roll-off selection module 301 is described as generating or calculating the lens roll-off values based on data obtained from the selected lens roll-off scenario table 306, in other embodiments, the at least one lens roll-off value may be retrieved from a lens roll-off correction scenario table (e.g., the selected lens roll-off scenario table 306 may include the lens roll-off values 315 and 316).

The image data and the lens roll-off values including the first lens roll-off value 315 and the second lens roll-off value 316 may be communicated to the lens roll-off correction based on brightness information module 302. The lens roll-off correction based on brightness information module 302 may retrieve the first lens roll-off value 315 and the second lens roll-off value 316 from the table of lens roll-off values 309. Alternatively, the lens roll-off correction based on brightness information module 302 may receive the first lens roll-off value 315 and the second lens roll-off value 316 from the lens roll-off selection module 301.

The lens roll-off correction based on brightness information module 302 may receive the brightness information 311 that include a brightness measurement of multiple regions of the image 350. The brightness information 311 may include a brightness measurement of each pixel in each region of the image 350 or an average brightness measurement of each region in the image 350. For example, the brightness information 311 may correspond to white balance statistics computed externally to the lens roll-off correction based on brightness information module 302. Alternatively, the lens roll-off correction based on brightness information module 302 may determine the average brightness measurement of each region. The average brightness of a region may be calculated by dividing a sum of the brightness measurements of each pixel in the region by the total number of pixels in the region. For example, a first region of the image 350 may be represented by two hundred and fifty pixels including the first pixel. Dividing the sum of all two hundred and fifty brightness measurements of the pixels by two hundred and fifty results in an average brightness measurement (e.g., the first brightness measurement 312) of the first region.

The lens roll-off correction based on brightness information module 302 may adjust the first lens roll-off value 315 and the second lens roll-off value 316 based on the brightness information 311. In one embodiment, the first lens roll-off value 315 is a value that represents the gain to be applied to a first pixel value to correct for lens roll-off of the first pixel. For example, when the first lens roll-off value 315 is equal to 1.35, the brightness of the first pixel may be increased by a gain of 1.35 to correct for the lens roll-off of the first pixel. The lens roll-off correction based on brightness information module 302 may adjust the first lens roll-off value 315 based on the first brightness measurement 312 of the first region that includes the first pixel, such as the average brightness measurement of the first region.

The lens roll-off correction based on brightness information module 302 may adjust the first lens roll-off value 315 by reducing a gain to be applied to the first pixel value. For example, the lens roll-off correction based on brightness information module 302 may reduce the first lens roll-off value 315 when an average brightness (e.g., the first brightness measurement 312) in the first region exceeds a first brightness threshold. The lens roll-off correction based on brightness information module 302 may store the result of reducing the first lens roll-off value 315 as the first corrected lens roll-off value 319. The first corrected lens roll-off value 319 may be stored in a table of corrected lens roll-off values 318 at the memory 308. For example, the lens roll-off correction based on brightness information module 302 may reduce the first lens roll-off value 315 (e.g., 1.35), to an adjusted value of 1.01 and may store the adjusted value 1.01 as the first corrected lens roll-off value 319 in the table of corrected lens roll-off values 318 in the memory 308.

In one embodiment, the second lens roll-off value 316 is a value that represents the gain that may be applied to a second pixel to correct for lens roll-off of the second pixel. For example, when the second lens roll-off value 316 is equal to 1.13, the brightness of the second pixel may be increased by a gain of 1.13 to correct for the lens roll-off of the second pixel. The lens roll-off correction based on brightness information module 302 may adjust the second lens roll-off value 316 based on the second brightness measurement 313 of the second region that includes the second pixel.

The lens roll-off correction based on brightness information module 302 may adjust the second lens roll-off value 316 by increasing a gain to be applied to the second pixel. For example, the lens roll-off correction based on brightness information module 302 may increase the second lens roll-off value 316 when an average brightness (e.g., the second brightness measurement 313) in the second region exceeds a second brightness threshold. The lens roll-off correction based on brightness information module 302 may store the result of increasing the second lens roll-off value 316 as the second corrected lens roll-off value 320. The second corrected lens roll-off value 320 may be stored in the table of corrected lens roll-off values 318. For example, the lens roll-off correction based on brightness information module 302 may increase the second lens roll-off value 316, (e.g., 1.13) to an adjusted value of 1.30 and may store the adjusted value 1.30 as the second corrected lens roll-off value 320 in the table of corrected lens roll-off values 318 in the memory 308.

The gain control module 304 may receive image data from the lens roll-off correction based on brightness information module 302 and retrieve the corrected lens roll-off values from the table of corrected lens roll-off values 318. The gain control module 304 may adjust the first corrected lens roll-off value 319 and the second corrected lens roll-off value 320 stored in the table of corrected lens roll-off values 318. For example, the gain control module 304 reduces the values stored in the table of corrected lens roll-off values 318 when the values are above an upper gain threshold 340. For example, when the first corrected lens roll-off value 319 is equal to 1.30 and the upper gain threshold 340 is a first gain threshold equal to 1.175, the gain control module 304 may reduce the first corrected lens roll-off value 319 to 1.175 and may optionally store the reduced value in the table of corrected lens roll-off values 318.

In a particular embodiment, the values stored in the table of corrected lens roll-off values 318 are increased by the gain control module 304 after the gain control module 304 detects that the corrected lens roll-off values of the table of corrected lens roll-off values 318 are below a lower gain threshold 341. For example, when the second corrected lens roll-off value 320 is equal to 1.01 and the lower gain threshold 341 is a second gain threshold equal to 1.05, the gain control module 304 may increase the second corrected lens roll-off value 320 to 1.05 and may optionally store the increased value in the table of corrected lens roll-off values 318.

The gain control module 304 may apply the corrected lens roll-off values, such as the first corrected lens roll-off value 319 and the second corrected lens roll-off value 320, to adjust the brightness of pixels of the image data. In a particular embodiment, the gain control module 304 increases the brightness 351 of the first pixel by the value stored as the first corrected lens roll-off value 319 in the table of corrected lens roll-off values 318. The gain control module 304 may multiply the brightness 351 of the first pixel by the first corrected lens roll-off value 319. For example, when the brightness 351 of the first pixel is equal to 1.1 and the first corrected lens roll-off value 319 is equal to 1.75, the gain control module 304 may multiply the brightness 351 (e.g., 1.1) of the first pixel by the first corrected lens roll-off value 319 (e.g., 1.75), resulting in a product equal to 1.925. The gain control module 304 may increase the brightness 351 of the first pixel to 1.925.

The gain control module 304 may decrease the brightness 352 of a second pixel based on the second corrected lens roll-off value 320. For example, when the brightness 352 of a second pixel value is equal to 1.4 and the second corrected lens roll-off value 320 is equal to 0.80, multiplying the brightness 352 (e.g., 1.4) of the second pixel by the second corrected lens roll-off value 320 (e.g., 0.80) results in a product equal to 1.12. The gain control module 304 may decrease the brightness 352 of the second pixel to 1.12. The gain control module 304 may transmit the adjusted image data for further processing to other modules, such as the noise reduction module 116 in the image processing system 130 of FIG. 1.

Correcting the lens roll-off values (e.g., first lens roll-off value 315 and second lens roll-off value 316) used during the lens roll-off correction operation may preserve details within the image 150, particularly in bright or low light areas of the image 150. For example, lens roll-off values produced by the lens roll-off selection module 301 for an image of a landscape picture that includes a bright skyline in the upper edge of the picture may increase the brightness of very bright pixels. In one embodiment, increasing the brightness of pixels representing the skyline may result in a loss of detail in the skyline. For example, variations in color and darkness in clouds that are part of the skyline may be less distinguishable as the brightness of all of the clouds is increased. Instead of increasing the brightness of a cloud pixel, the lens roll-off correction based on brightness information module 302 may reduce the brightness of a pixel representing a cloud after determining that the region surrounding the cloud pixel is already bright. Even though the pixel representing the cloud is in an area of the image that may have a reduced brightness due to lens roll-off, the brightness of the cloud pixel may be decreased. Thus, the lens roll-off correction based on brightness information system 300 of FIG. 3 may preserve image detail.

Figure 4:
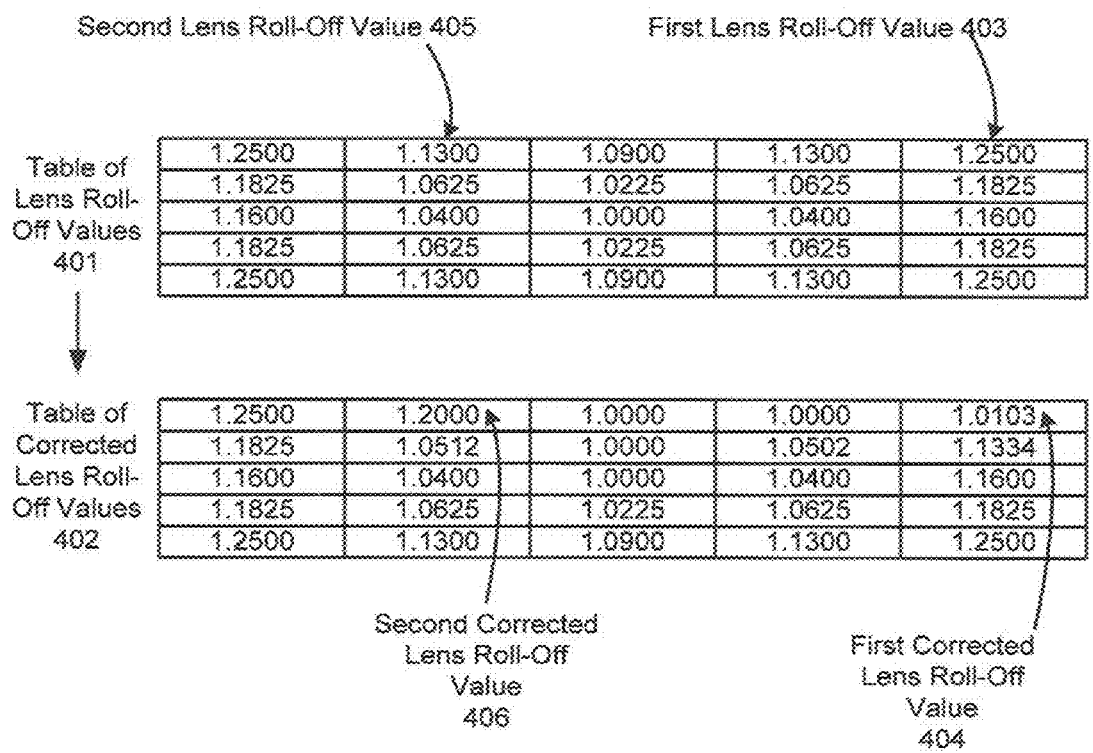
FIG. 4 is a general diagram that illustrates correcting lens roll-off values based on brightness information.

Referring to FIG. 4, a general diagram illustrates correcting lens roll-off values based on brightness information and is generally designated 300. A lens roll-off correction based on brightness information module (e.g., the lens roll-off correction based on brightness information module 302 of FIG. 2) may correct lens roll-off values stored in a table of lens roll-off values 401 and may store the corrected lens roll-off values in a corrected lens roll-off table 402.

For example, in FIG. 4, a first lens roll-off value 403 is equal to 1.2500. Correcting the first lens roll-off value 403 may include reducing the first lens roll-off value 403 based on brightness information. For example, the lens roll-off correction based on brightness information module 302 of FIG. 3 may reduce a first lens roll-off value 403 when an average brightness in a first region exceeds a first brightness threshold. The reduced lens roll-off value may be stored as a first corrected lens roll-off value 404. In a particular embodiment, the first corrected lens roll-off value 404 may be stored in the table of corrected lens roll-off values 402. For example, the lens roll-off correction based on brightness information module 302 of FIG. 3 may reduce the first lens roll-off value 315 that is equal to 1.2500 to 1.0103 and store the value 1.0103 as the first corrected lens roll-off value 319 in the table of corrected lens roll-off values 318.

As another example, in FIG. 4, a second lens roll-off value 405 is equal to 1.1300. Correcting the second lens roll-off value 405 may include the lens roll-off correction based on brightness information module 302 increasing the second lens roll-off value 405 to be applied to the second pixel. For example, the lens roll-off correction based on brightness information module 302 of FIG. 3 may increase the second lens roll-off value 405 when an average brightness in a second region is below a second brightness threshold. The increased lens roll-off value may be stored as second corrected lens roll-off value 406. For example, the second corrected lens roll-off value 306 may be stored in the table of corrected lens roll-off values 402. For example, the lens roll-off correction based on brightness information module 302 of FIG. 3 may reduce a second lens roll-off value 316 that is equal to 1.2500 to 1.0103 and store the value 1.0103 as the second corrected lens roll-off value 320 in the table of corrected lens roll-off values 318.

As illustrated in the particular implementation of FIG. 4, the lens roll-off values may be provided to representative pixel locations, such as the center of each region of the grid 314, and a lens roll-off value for each pixel may be calculated via a bicubic or bilinear interpolation of the provided values. However, in other embodiments, the lens roll-off values operation may instead be implemented on a pixel-by-pixel basis, such as by computing a value of a correction function at each pixel location.

Figure 5:
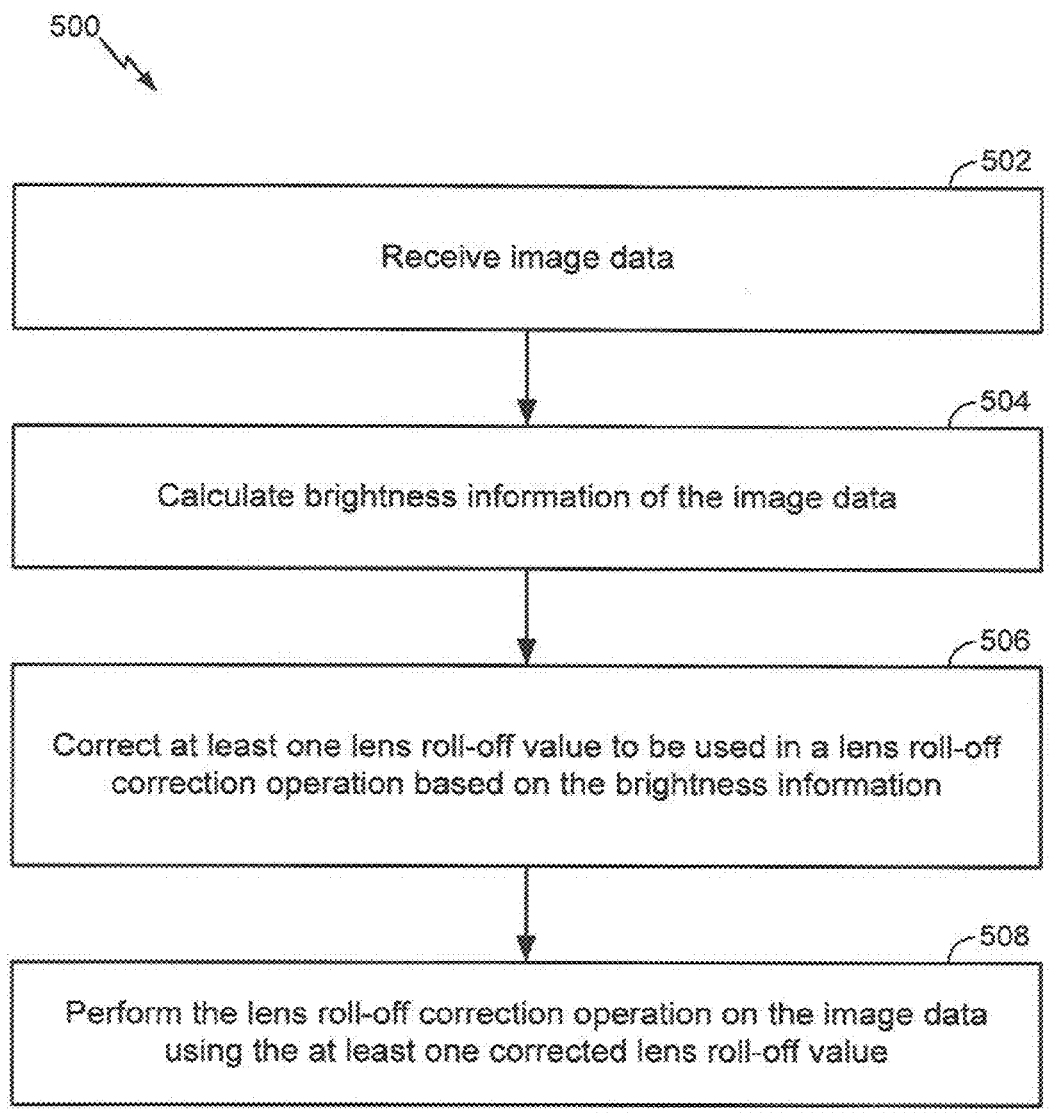
FIG. 5 is a flow diagram of an illustrative embodiment of a method of performing a lens roll-off correction operation on image data using values corrected based on brightness information.

FIG. 5 is a flow diagram of a first illustrative embodiment of a method 500 of performing lens roll-off correction based on brightness information on image data. In a particular embodiment, the method 500 is performed by any of the systems of FIGS. 1-3, or any combination thereof. Image data is received, at 502. For example, the image processor 368 of FIG. 3 receives image data from the sensor 390. Brightness information of the image data is calculated, at 504. For example, the image processor 368 of FIG. 3 may calculate the brightness information 311 of the image data. At least one lens roll-off value to be used in a lens roll-off correction operation is corrected based on the brightness information, at 506. For example, the lens roll-off correction based on brightness information module 302 corrects the first lens roll-off value 315 based on the first brightness measurement 312 of the brightness information 311. The lens roll-off correction operation is performed on the image data using the corrected at least one lens roll-off value, at 508. For example, the gain control module 304 performs the lens roll-off correction operation on the image data (e.g., pixel value 351) using the corrected at least one lens roll-off value (e.g., corrected lens roll-off value 319).

Performing the lens roll-off correction operation on the image data using values corrected based on brightness information may preserve or enhance details within the image data, particularly in bright or low light areas of the image data. For example, bright regions are prevented from exceeding a brightness threshold to prevent over-saturation, and dark areas may be enhanced.

Figure 6:
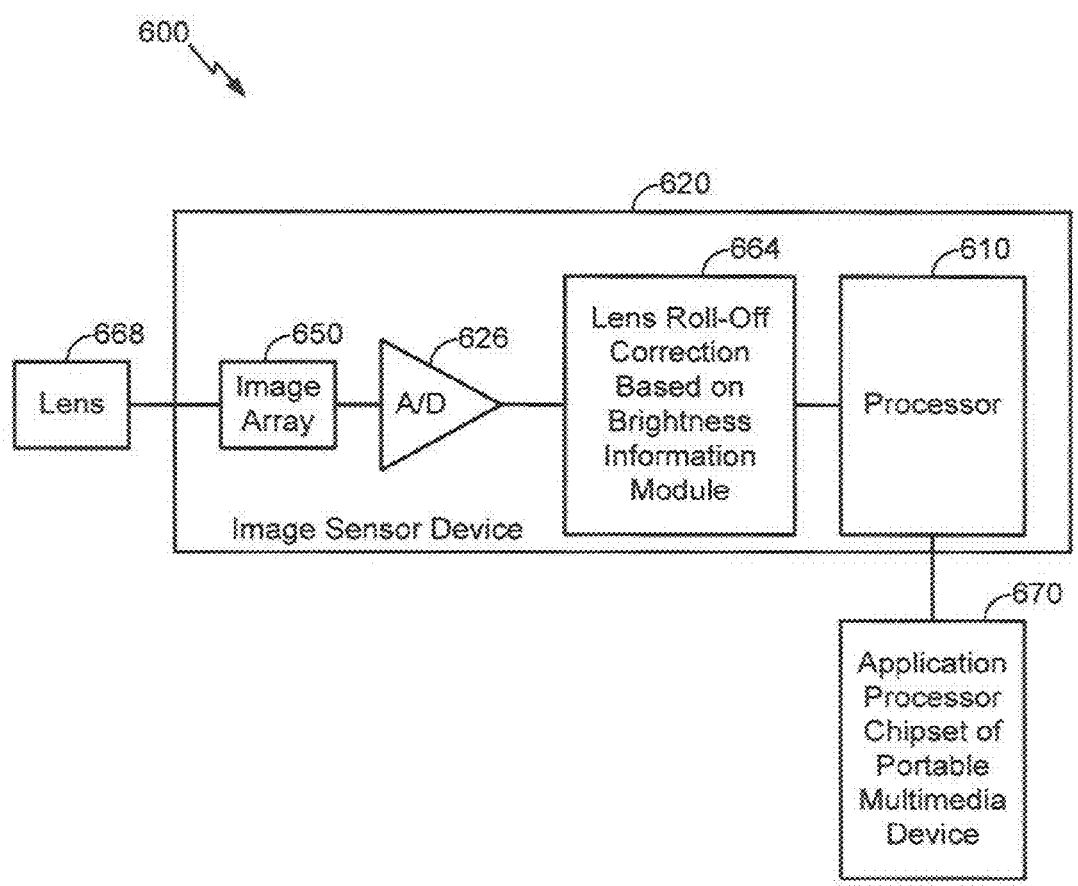
FIG. 6 is a block diagram of a particular embodiment of a device to perform a lens roll-off correction operation on image data using values corrected based on brightness information.

FIG. 6 is a block diagram of particular embodiment of a device 600 to perform a lens roll-off correction operation on image data using values corrected based on brightness information. The device 600 includes an image sensor device 620 that is coupled to a lens 668 and is also coupled to an application processor chipset of a portable multimedia device 670. The image sensor device 620 includes a lens roll-off correction based on brightness information module 664 that may implement one or more of the modules or systems of FIGS. 1-3, may operate in accordance with any of the embodiments or methods of FIG. 5, or any combination thereof.

The lens roll-off correction based on brightness information module 664 is configured to receive image data from an image array 650, such as via an analog-to-digital (A/D) convertor 626 configured to receive an output of the image array 650. The lens roll-off correction based on brightness information module 664 may correct lens roll-off values based on brightness measurements obtained from images captured at the image array 650 to enable lens roll-off correction based on brightness information functionality with the image array 650. In addition, the lens roll-off correction based on brightness information module 664 may compress the resulting image to be compatible with lower-resolution transport and storage mechanisms. For example, the lens roll-off correction based on brightness information module 664 may include the lens roll-off selection module 301 of FIG. 3, the lens roll-off correction based on brightness information module 302 of FIG. 3, and the gain control module 304 of FIG. 3.

The image sensor device 620 may also include a processor 610. In a particular embodiment, the lens roll-off correction based on brightness information module 664 is executed by the processor 610. For example, the processor 610 may be configured to read instructions from a processor-readable medium and to execute the instructions to implement the functions of the lens roll-off correction based on brightness information module 664. In another embodiment, the lens roll-off correction based on brightness information module 664 is implemented as image processing circuitry. The processor 610 may also be configured to perform additional image processing operations, such as one or more of the operations performed by the modules 114,116, and 118 of FIG. 1. The processor 610 may provide processed image data to the application processor chipset of the portable multimedia device 670 for further processing, transmission, storage, display, or any combination thereof.

Image data from the image array 650 may be transmitted to the lens roll-off correction based on brightness information module 664 to perform a lens roll-off correction operation without changes to the hardware of the image array 650. Thus, lens roll-off correction based on brightness information may be performed on image data and may be implemented with existing image array hardware.

Figure 7:
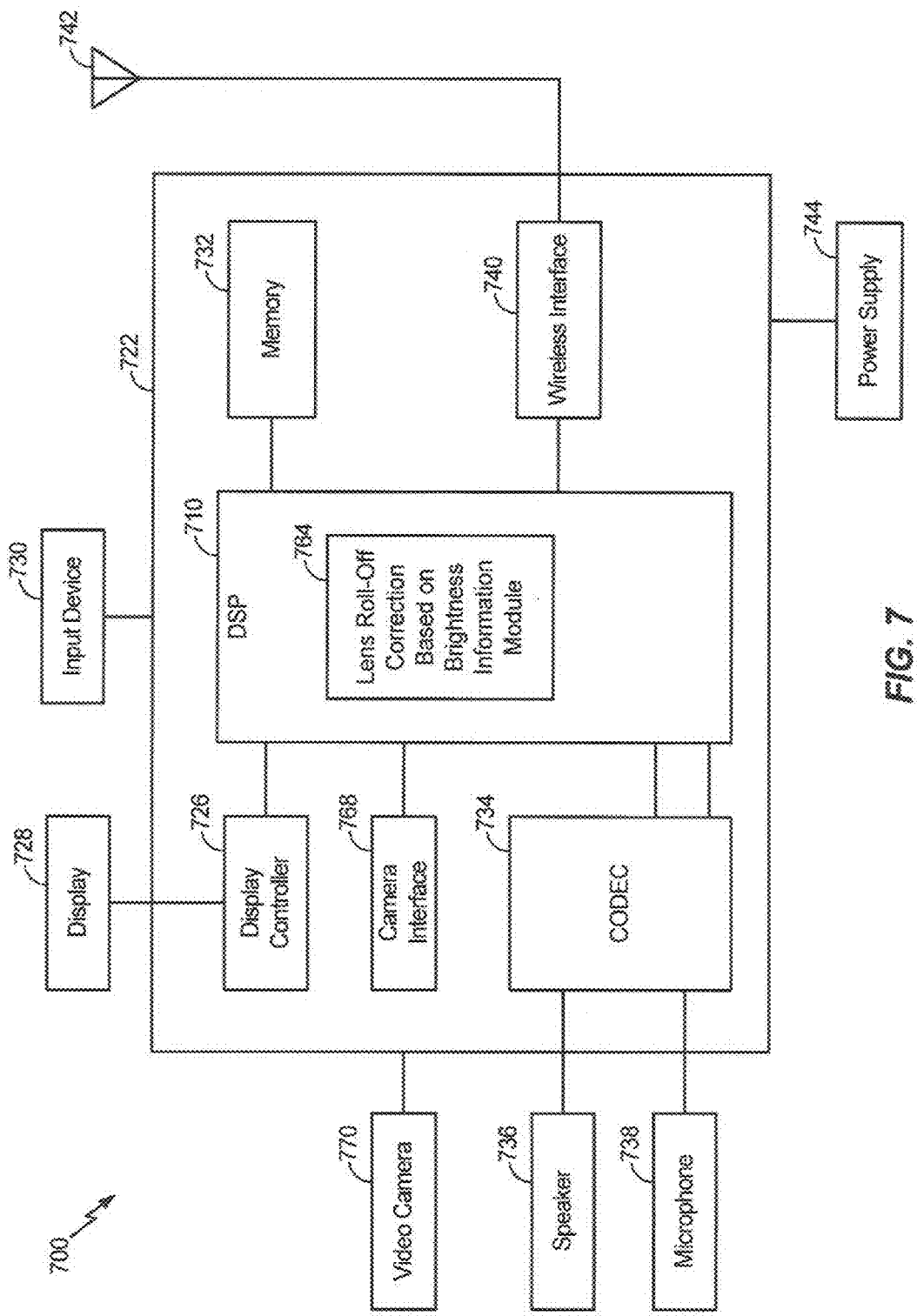
FIG. 7 is a block diagram of a particular embodiment of a wireless communication device including a lens roll-off correction based on brightness information module.

FIG. 7 is a block diagram of an embodiment of a wireless communication device 700 having a lens roll-off correction based on brightness information module 764. The wireless communication device 700 may be implemented as a portable wireless electronic device that includes a processor 710, such as a digital signal processor (DSP), coupled to a memory 732. In an illustrative example, the lens roll-off correction based on brightness information module 764 includes one or more of the modules or systems of FIGS. 1-3 and 6, or operates in accordance with any of the embodiments or methods of FIG. 5, or any combination thereof. The lens roll-off correction based on brightness information module 764 may be incorporated into the processor 710 or may be a separate device.

In one embodiment, the wireless communication device 700 includes a camera interface 768 that is coupled to the processor 710 and also coupled to a camera, such as a video camera or still camera 770. A display controller 726 is coupled to the processor 710 and to a display device 728. A coder/decoder (CODEC) 734 can also be coupled to the processor 710. A speaker 736 and a microphone 738 may be coupled to the CODEC 734. A wireless interface 740 may be coupled to the processor 710 and to a wireless antenna 742.

In a particular embodiment, the processor 710 includes the lens roll-off correction based on brightness information module 764 and is adapted receive image data captured by the camera 770 to capture brightness information of the image data, correct at least one lens roll-off value to be used in a lens roll-off correction operation based on brightness information, and perform the lens roll-off correction operation on the image data using the corrected lens roll-off value functionality with the camera 770. In addition, the lens roll-off correction based on brightness information module 764 may compress a resulting processed image to be compatible with lower-resolution transport and storage mechanisms.

The processor 710 may also be adapted to generate and compress lens roll-off correction based on brightness information image data that may be received from various sources. For example, the image data may include video data or still images from the camera 770, image data from a wireless transmission received via the wireless interface 740, or from other sources such as an external device coupled via a universal serial bus (USB) interface (not shown), as illustrative, non-limiting examples.

In a particular embodiment, the processor 710 is configured to generate image data with adjusted gain values added to the pixel values of the image and to provide the adjusted image data for display at the display device 728. In addition, the processor 710 may be further configured to store the image data at the memory 732 or to provide the image data to be communicated via the wireless interface 740.

The display controller 726 is configured to receive the processed image data and to provide the processed image data to the display device 728. In addition, the memory 732 may be configured to receive and to store the processed image data, and the wireless interface 740 may be configured to receive the processed image data for transmission via the antenna 742.

In a particular embodiment, the signal processor 710, the display controller 726, the memory 732, the CODEC 734, the wireless interface 740, and the camera interface 768 are included in a system-in-package or system-on-chip device 722. In a particular embodiment, an input device 730 and a power supply 744 are coupled to the system-on-chip device 722. Moreover, in a particular embodiment, as illustrated in FIG. 6, the display device 728, the input device 730, the speaker 736, the microphone 738, the wireless antenna 742, the video camera 770, and the power supply 744 are external to the system-on-chip device 722. However, each of the display device 728, the input device 730, the speaker 736, the microphone 738, the wireless antenna 742, the video camera 770, and the power supply 744 can be coupled to a component of the system-on-chip device 722, such as an interface or a controller.

Those of skill would further appreciate that the various illustrative logical blocks, configurations, modules, circuits, and algorithm steps described in connection with the embodiments disclosed herein may be implemented as electronic hardware, computer software executing at a processor, or combinations of both. Various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in software including instructions executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable any person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A method in an electronic device having an image sensor and a lens, comprising:
   receiving image data from the image sensor;
   obtaining lens roll-off values relating to the lens;
   calculating brightness information of the image data;
   correcting at least one lens roll-off value to be used in a lens roll-off correction operation based on the brightness information by reducing the at least one lens roll-off value when a performance of the lens roll-off correction operation would increase a brightness value of a pixel above a brightness threshold; and
   performing the lens roll-off correction operation on the image data using the at least one corrected lens roll-off value.

2. The method of claim 1, wherein performing the lens roll-off correction operation on the image data includes increasing a brightness value of a pixel in the image data.

3. The method of claim 1, further comprising correcting the at least one lens roll-off value based on a gain threshold.

4. The method of claim 3, wherein correcting the at least one lens roll-off value based on the gain threshold includes reducing the at least one lens roll-off value when the at least one lens roll-off value is above an upper gain threshold.

5. The method of claim 3, wherein correcting the at least one lens roll-off value based on the gain threshold includes increasing the at least one lens roll-off value when the lens roll-off value is below a lower gain threshold.

6. The method of claim 2, wherein increasing the brightness value of the pixel includes multiplying the brightness value of the pixel by the at least one corrected lens roll-off value.

7. The method of claim 1, wherein the at least one lens roll-off value is computed from a lens roll-off correction function.

8. The method of claim 7, wherein correcting the at least one lens roll-off value includes changing the lens roll-off correction function.

9. The method of claim 1, further comprising defining a plurality of regions of the image data.

10. The method of claim 9, wherein at least one region is identified using edge detection.

11. The method of claim 10, wherein identifying the at least one region using edge detection includes identifying a region containing pixels with substantially similar brightness levels, wherein the substantially similar brightness levels differ from the brightness levels outside the identified region by a predetermined amount.

12. An apparatus comprising:
   an image sensor;
   a lens:
   an image processor configured to:
      receive image data from the image sensor;
      obtain lens roll-off values relating to the lens;
      calculate brightness information of the image data;
      correct at least one lens roll-off correction value to be used in a lens roll-off correction operation based on the brightness information by reducing the at least one lens roll-off value when a performance of the lens roll-off correction operation would increase a brightness value of a pixel above a brightness threshold; and
      perform the lens roll-off correction operation using the at least one corrected lens roll-off value.

13. The apparatus of claim 12, wherein the brightness information comprises a brightness value corresponding to each of a plurality of color components.

14. The apparatus of claim 12, wherein performing the lens roll-off correction operation on the image data includes increasing a brightness value of at least one color component of the pixel.

15. The apparatus of claim 12, wherein the image processor is further configured to determine an average brightness measurement of a region.

16. The apparatus of claim 15, wherein correcting the at least one lens roll-off value based on the brightness information includes correcting the at least one lens roll-off value based on the average brightness measurement of the region.

17. The apparatus of claim 12, wherein the image processor is further configured to define at least one region of the image data.

18. The apparatus of claim 12, wherein the image processor is further configured to define a plurality of regions of the image data, wherein the plurality of regions form a grid of substantially equal sized regions.

19. The apparatus of claim 12, wherein the at least one lens roll-off value is retrieved from a lens roll-off correction scenario table, wherein the lens roll-off correction scenario table is selected based on a lighting condition associated with the image data.

20. The apparatus of claim 12, wherein the corrected lens roll-off values are stored in a table of corrected lens roll-off values.

21. An apparatus comprising:
an image sensor;
a lens;
means for receiving image data from the image sensor;
means for obtaining lens roll-off values relating to the lens;
means for calculating brightness information of the image data;
means for correcting at least one lens roll-off value to be used in a lens roll-off correction operation based on the brightness information by reducing the at least one lens roll-off value when a performance of the lens roll-off correction operation would increase a brightness value of a pixel above a brightness threshold; and
means for performing the lens roll-off correction operation using the at least one corrected lens roll-off value.

22. The apparatus of claim 21, further comprising means for correcting the at least one lens roll-off value based on a gain threshold.

23. The apparatus of claim 22, wherein the means for correcting the at least one lens roll-off value based on the gain threshold includes means for reducing the at least one lens roll-off value when the at least one lens roll-off value is above an upper gain threshold.

24. The apparatus of claim 22, wherein the means for correcting the at least one lens roll-off value based on the gain threshold includes means for increasing the at least one lens roll-off value when the lens roll-off value is below a lower gain threshold.

25. A non-transitory computer readable medium storing computer executable code comprising:
code for receiving image data from an image sensor;
code for obtaining lens roll-off values relating to a lens;
code for calculating brightness information of the image data;
code for correcting at least one lens roll-off value to be used in a lens roll-off correction operation based on the brightness information by reducing the at least one lens roll-off value when a performance of the lens roll-off correction operation would increase a brightness value of a pixel above a brightness threshold; and
code for performing the lens roll-off correction operation using the corrected lens roll-off value.

26. The computer readable medium of claim 25, wherein the brightness information comprises a brightness value corresponding to each of a plurality of color components.

27. The computer readable medium of claim 25, wherein the code for performing the lens roll-off correction operation on the image data includes code for increasing a brightness value of at least one color component of the pixel.

* * * * *